Oct. 2, 1956 L. W. BELOUNGIE 2,765,115

ARITHMETIC ADDERS

Filed Oct. 30, 1951

INVENTOR
LAWRENCE W. BELOUNGIE
BY Elmer J. Gorn
ATTORNEY

United States Patent Office 2,765,115

Patented Oct. 2, 1956

2,765,115

ARITHMETIC ADDERS

Lawrence W. Beloungie, Watertown, Mass., assignor to Raytheon Manufacturing Company, Newton, Mass., a corporation of Delaware Application October 30, 1951, Serial No. 253,900

7 Claims. (Cl. 235—61)

This invention relates to an arithmetic adding circuit and more particularly relates to a three-input binary adding circuit employing crystal diode gating structures.

In order to perform an addition of two numbers in any radix system, an addend digit, an augend digit, and a previous-carry digit must be summed. A system in which three digits are received simultaneously at the input is called a three-input adder. A description of a three-input binary adder is given at paragraph 13–4–2 on pages 276 to 280 of "High-Speed Computing Devices" by Engineering Research Associates, published by McGraw-Hill Book Company.

Prior three-input adder circuits have made use of a large number of vacuum tubes which are uneconomical of space and power consumption. In the circuit, according to this invention, diode rectifier gating structures are used in lieu of a large number of vacuum tubes, thereby considerably reducing power consumption and space required.

One of the objects of this invention is to provide an improved binary adding apparatus for adding two voltages representing digits of binary numbers while taking into account the carry voltage from the preceding digital column.

A further object of this invention is to provide a three-input arithmetic adding circuit in which at least a considerable number of vacuum tube gating circuits are eliminated, with a consequent reduction in required power and space.

Figure 1:
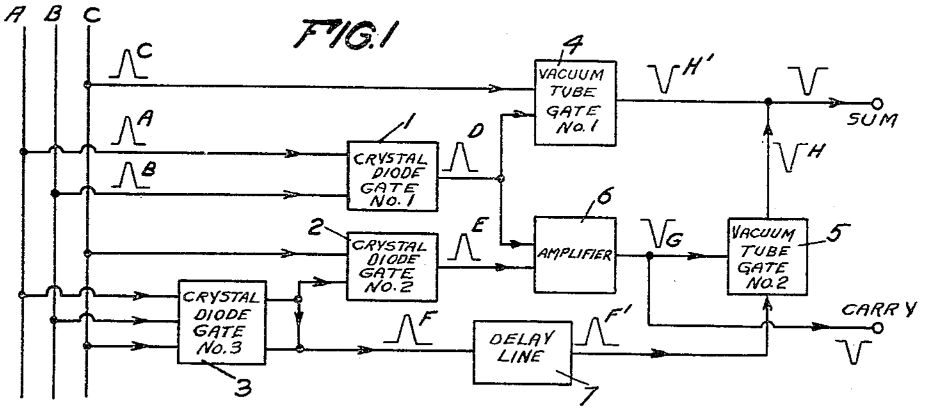
Figure 2:
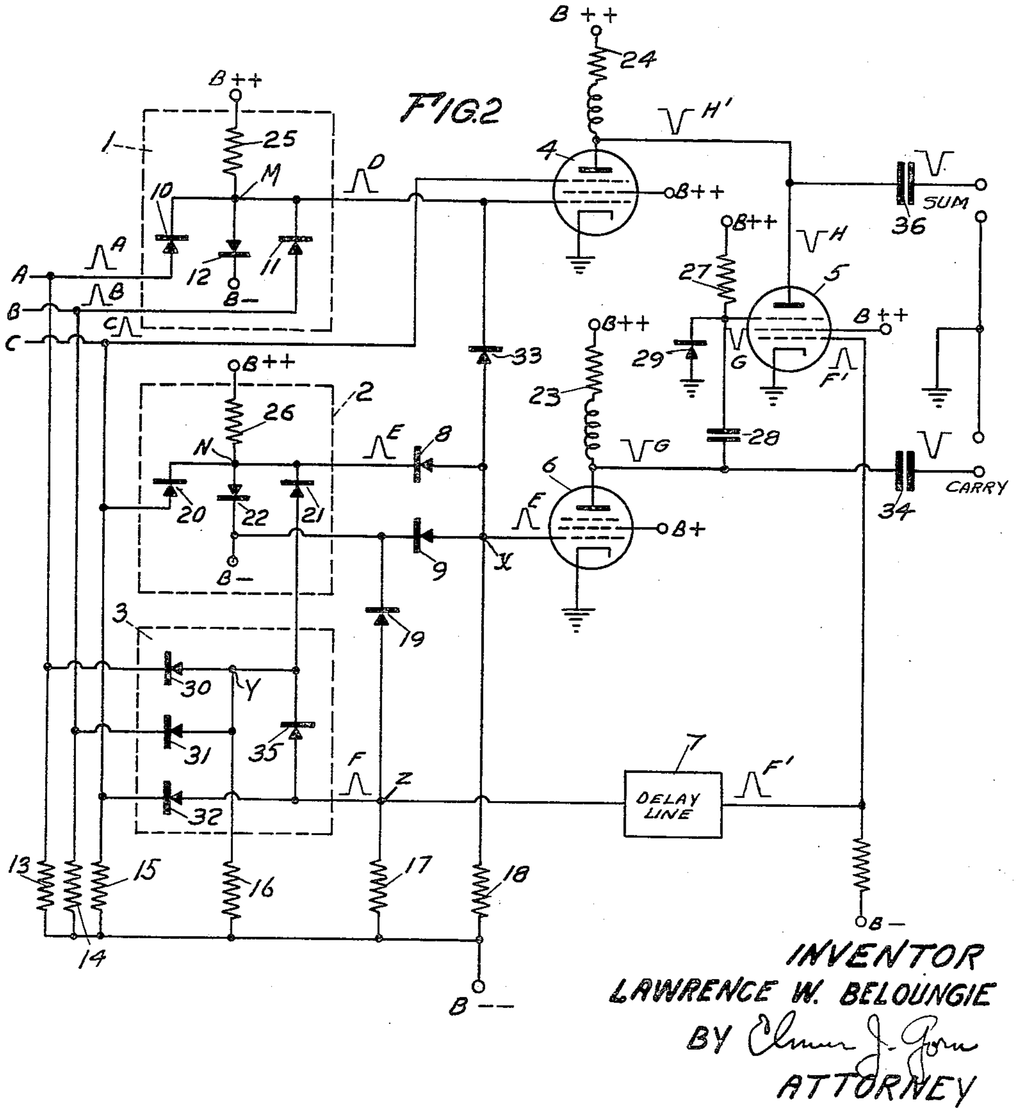

The invention both as to its organization and method of operation, as well as additional objects and advantages thereof, will best be understood from a consideration of the following description and the accompanying drawings, in which:

Fig. 1 is a diagrammatic showing of the binary adder according to the invention; and Fig. 2 is a circuit diagram of the subject invention.

Referring to Fig. 1, there is illustrated in diagrammatic form an electronic adder comprising three diode rectifier gating structures 1, 2, and 3 and two vacuum tube gates 4 and 5.

A binary addition circuit is required to satisfy three fundamental requirements. If a pulse of voltage is designated as a "one" and the absence of said pulse at the time usually allotted to a pulse as a "zero," then an output pulse should be developed at the Sum output terminals of the adder and a "zero" should be developed at the Carry output terminals when one and only one pulse of three possible pulses, viz., addend, augend and carry, is present at the adder input terminals. If there are any two of said three pulses present at the adder input terminals, a "zero" or no pulse should be developed at the Sum output terminals, but a pulse should be developed at the Carry output terminals. If all three of said input pulses are present at the adder input terminals, then a "one" should be developed at the adder Sum output terminals and a "one" developed at the Carry output terminals.

The input pulses representing adend, augend, and carry, as well as the lines introducing said pulses to the adder, will be hereinafter referred to as A, B, and C, respectively.

If both lines A and B have an impulse present, gate 1 will transfer a single positive impulse D to the input of amplifier 6. If only one of lines A and B has an impulse and, in addition, the carry line C has an impulse developed as a result of a previous addition, then gate 2 will transfer a positive impulse E to the input of amplifier 6. If all three lines are energized simultaneously, both gates 1 and 2 serve to transfer positive impulses D and E to amplifier 6, and gate 3 transfers a positive pulse F through a pulse time delay line 7 to gate 5.

If a positive pulse has been transferred to amplifier 6 by either gate 1 or 2, an inverted or negative pulse G appears at the output circuit of amplifier 6 and is applied to gate 5, together with the delayed pulse F′, gate 5 being thereby closed and no pulse being developed at its output terminals. If only line A or line B has an impulse present, gates 1 and 2 are closed, and no positive pulse occurs at the input to amplifier 6. There is, therefore, no negative output G from amplifier 6, and the now open gate 5 produces a negative output pulse H which is coupled to the Sum terminals.

If pulses are present on all three lines, gate 4 opens by virtue of the simultaneous presence of positive pulses C and D, and a pulse H′ is developed at the Sum output terminals. It will be seen that a Sum output is developed by activating either gate 4 or gate 5.

The Carry pulse is developed in the output or plate circuit of the amplifier 6 and is, of course, present whenever positive pulses D or E, or both, are applied to the input of the amplifier. In other words, a Carry pulse is produced at the Carry output terminals whenever lines A and B are simultaneously energized or whenever the lines C and either line A or line B, or both, are simultaneously energized.

In Fig. 2, a more detailed description of the circuitry is given.

The direct current supply voltages labeled B++, B+, B—, and B—— in Fig. 2 of the drawing are approximately 120 volts positive, 60 volts positive, 10 volts negative and 100 volts negative, respectively. These values are merely illustrative, however, and the circuit according to the invention is not limited to these values.

Gate 1 is composed of diode rectifiers 10, 11, and 12 and resistor 25. Although the diodes in Fig. 2 are shown as crystal rectifiers, they may be either crystal rectifiers or diode vacuum tube rectifiers. For accuracy we need a reference voltage which is not subject to fluctuation. For this reason, diode 12 is used as a clamper to maintain point M at very nearly the B— reference level. The voltage drop across diode 12 is very small, being of the order of one volt. Therefore the actual quiescent potential at point M is approximately 11 volts negative. Normally current flows through diode 12 from B— to the common plate connection M and thence from anode to cathode of both diodes 10 and 11 and their associate resistors 13 and 14 to B——. Current also flows from B++ through resistor 25, diodes 10 and 11 and their associated resistors 13 and 14 to B——. Approximately half of the current to gate 1 is supplied through resistor 25. The values of resistors 13, 14 and 25 are chosen so that the voltage drop across 25 and the voltage rise across 13 and 14 are sufficient to bring the potential at point M to approximately 11 volts negative.

If only line A or line B carries a pulse, no appreciable rise in voltage occurs at point M since the diode connected to the line not carrying a pulse is still conducting and current is flowing in resistor 25. The voltage at point M would rise appreciably when one of the two diodes 10 and 11 is rendered non-conducting were it not for the clamping diode 12 which is still conducting and holds point M at approximately 11 volts negative.

If, however, both lines carry a pulse simultaneously, diodes 10 and 11 both cease conducting. The path from B— through diode 12 and diodes 10 and 11 to B— — is opened and clamping diode 12 becomes nonconductive. The potential at point M, therefore, rises toward B+ +. The positive voltage pulse D thus developed across 25 is transferred via diode 33, whose resistance when conducting is small compared to that of resistor 18, to the control grid of amplifier 6.

If only one of the lines A and B carries an impulse but the third or carry line C has an impulse developed as a result of a previous addition, then gate 2, comprising diodes 20, 21, and 22 and resistor 26, is energized. The operation of gate 2 is identical to that of gate 1 and need not be described in detail. The voltage at the cathode of 20 rises upon the appearance of a carry pulse and the voltage at the cathode of 21 rises when a positive input pulse, which is transferred through either diodes 30 or 31 to diode 21, appears on either line A or line B. A positive pulse E is thus developed at the common plate connection N of gate 2 and is transferred to the control grid of amplifier 6 via diode 8. This pulse E is combined with the positive pulse D transferred from gate 1 via diode 33. Tube 6 is normally nonconductive and conducts only during the presence of positive pulses D or E, or both, corresponding to the presence of two or three input pulses.

The plate current flowing through resistor 23 during the coincidence of two or three input pulses causes a negative pulse G to appear at the plate circuit of amplifier 6. This negative pulse is coupled to the Carry output terminal of the adder through coupling condenser 34. It is evident, therefore, that there will be a negative Carry output pulse developed only during the coincidence of two or three input pulses and that no Carry pulse will be developed if only line A or line B is energized.

Crystal diode 9 is a clamping crystal for holding the point X at which the pulses D and E are combined at the reference potential of B—.

Diodes 30, 31, and 32 and resistor 16 comprise gate 3. If either or both of lines A and B are energized, either or both diodes 30 and 31 are rendered conducting and a positive pulse is transferred to point Y. Since the voltage drop across 30 or 31 is very small, while conducting, the voltage at point Y is approximately equal to that at A or B, as the case may be. If line C is energized, diode 32 conducts and a voltage approximately equal to that at C is developed at point Z. The voltage at point Y is transferred to point Z by means of diode 35, whose function is to isolate line C from lines A and B. A positive pulse F is developed at point Z if any one of lines A, B or C is pulsed. This satisfies the requirement that an output pulse be developed when any one line is energized. Diode 19 serves as a clamper to hold point Z at approximately the reference potential B—. The positive pulse F is delayed approximately one-sixth of the pulse time by means of delay line 7 to facilitate the inhibition demanded by the requirement that no pulse develop at gate 5 when any two input lines are energized, as will be described later. The delay line is not critical and may be eliminated without making the adder inoperative.

The positive output of delay line 7 is applied to the control grid of vacuum tube gate 5; this positive pulse F′ is always present at the control grid unless there are no input pulses to the adder. When a negative Carry pulse G is present, corresponding to the condition of two or three input pulses, it is applied to the suppressor grid of gate 5. This disables gate 5 by driving the suppressor grid so low in potential that plate current cannot flow through 5. Thus, whenever two or three pulses occur simultaneously, there is no pulse H produced. When only one input pulse is present, there is no input to amplifier 6, as previously explained, and no negative pulse G is present at the grid of gate 5 and gate 5 remains open. A negative pulse H is derived at the plate of 5 and transferred by means of condenser 36 to the Sum output terminals.

It has beenn pointed out that the positive pulse F′ on the grid of gate 5 must be inhibited by the negative pulse G during the presence of two or three input pulses. In order to inhibit reliably, it is necessary for the negative pulse to reach the suppressor grid of 5 before the positive pulse reaches the control grid. By delaying the signal F being applied to the control grid of gate 5 by delay line 7 until the negative-going portion of pulse G has had an opportunity to reach a sufficiently negative value, positive gating of gate 5 is insured.

Diode 29 serves as a D. C. restorer to maintain the direct current component of the voltage at the suppressor grid of 5 constant regardless of shifting effects of capacitor 28 on the series of pulses G.

When a carry input pulse (pulse C) is present in addition to pulses on lines A and B, gate 4 opens because of the simultaneous presence of positive pulses C and D on the control grid and suppressor grid, respectively, of tube 4. Tube 4 is nonconducting so long as just one of the two grids are energized. When gate 4 opens, a negative output puse H′ is developed and is coupled to the sum output terminals through capacitor 33. It will be noticed that although gate 5 is closed when either two or three pulses are present, when three input pulses are simultaneously present, gate 4 opens to provide a Sum output. A sum is thereby developed by activating gate 4 when pulses are present on all three input lines, or by activating gate 5 when but a single input pulse is present.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claim is:

1. An electric computer device having sum and carry output terminals and first, second, and third input terminals adapted to receive, respectively, first input pulses representative of an addend, second input pulses representative of an augend, and third input pulses corresponding to a previous carry digit, a first gate responsive to the simultaneous presence of said first and second input pulses for producing a first waveform, a second gate responsive to the simultaneous presence of said third input pulse and either of said first and second input pulses for producing a second waveform, means responsive to either of said first and second waveforms for deriving a first output pulse at said carry output terminal indicative of the presence of two or more of said input pulses, a third gate responsive to the simultaneous presence of said third input pulse and said first waveform for producing a second output pulse at said sum output terminal indicative of the simultaneous presence of all of said input pulses, means energized by any one of said input pulses and operable during the absence of said first output pulse for producing at said sum output terminal a third output pulse indicative of the presence of only one of said input pulses and similar in character to said second output pulse.

2. An electronic computer device as described in claim 1 in which said first and second gates comprise a plurality of crystal diodes.

3. An electronic computer device having sum and carry output terminals and first, second, and third input terminals adapted to receive, respectively, first input pulses representative of an addend, second input pulses representative of an augend, and third input pulses corresponding to a previous carry digit, a first gate responsive to the simultaneous presence of said first and second input pulses for producing a first waveform, a second gate responsive to the simultaneous presence of said third input pulse and either of said first and second input pulses for producing a second waveform, first means responsive to either of said first and second waveforms for deriving a first output pulse at said carry output terminal indicative of the simultaneous presence of two or more of said input pulses, a third gate responsive to the simultaneous presence of said third input pulse and said first waveform for producing a second output pulse at said sum output terminal indicative of the simultaneous presence of all of said input pulses, second means responsive to the presence of any one of said input pulses for deriving a voltage impulse, a third means energized by said voltage impulse and operable during the absence of said first output pulse for producing at said sum output terminal a third output pulse indicative of the presence of only one of said input pulses and similar in character to said second output pulse.

4. An electronic computer device as described in claim 3 in which said voltage impulse is applied to a delay line.

5. An electronic computer device comprising first, second, and third input terminals adapted to receive, respectively, first input pulses representative of an addend, second input pulses representative of an augend, and third input pulses corresponding to a previous carry digit, a first gate responsive only to the simultaneous presence of said first and second input pulses to produce a first waveform, a second gate responsive only to the simultaneous presence of said third input pulse and either of said first and second input pulses to produce a second waveform, first means responsive to any of said input pulses to produce a third waveform, a third gate responsive only to the simultaneous presence of said first waveform and said third input pulse to produce a first output pulse indicative of the presence of all of said input pulses, second means for deriving a second output pulse in response to either or both of said first and second waveforms which is indicative of the presence of two or more of said input pulses, and a fourth gate receptive of said third waveform and inhibited by said second output pulse for producing a third output pulse indicative of the presence of only one of said input pulses.

6. An electronic computer device comprising first, second, and third input terminals adapted to receive, respectively, first input pulses representative of an addend, second input pulses representing of an augend, and third input pulses corresponding to a previous carry digit, a first gate responsive only to the simultaneous presence of said first and second input pulses to produce a first waveform, first means responsive to either of said first and second input pulses for deriving a first voltage, a second gate connected to said first means and responsive only to the simultaneous presence of said third input pulse and said first voltage to produce a second waveform, said first means being further responsive to any of said input pulses to produce a third waveform, a third gate responsive only to the simultaneous presence of said first output waveform and said third input pulse to produce a first output pulse indicative of the presence of all of said input pulses, second means including an amplifier for deriving a second output pulse in response to either or both of said first and second waveforms which is indicative of the presence of two or more of said input pulses, and a fourth gate receptive of said third waveform and inhibited by said second output pulse for producing a third output pulse indicative of the presence of only one of said input pulses.

7. An electronic computer device as described in claim 6 in which said first means and said first and second gates comprise a plurality of crystal diodes.

References Cited in the file of this patent

UNITED STATES PATENTS

| | | |
|---|---|---|
| 2,543,442 | Derch | Feb. 27, 1951 |
| 2,556,200 | Lesti | June 12, 1951 |
| 2,557,729 | Eckert | June 19, 1951 |
| 2,563,589 | Den Hertog | Aug. 7, 1951 |
| 2,572,912 | Bucher | Oct. 30, 1951 |
| 2,580,771 | Harper | Jan. 1, 1952 |
| 2,609,143 | Stibitz | Sept. 2, 1952 |
| 2,634,052 | Bloch | Apr. 7, 1953 |
| 2,639,859 | Serrell | May 26, 1953 |
| 2,655,598 | Eckert et al. | Oct. 13, 1953 |
| 2,673,293 | Eckert et al. | Mar. 23, 1954 |

OTHER REFERENCES

Electronics Magazine, "Digital Computer Switching Circuits," by C. H. Page; (pages 110 through 116), September 1948.

Proceedings of the IRE, "Diode Coincidence and Mixing in Digital Computers," by Tung; (pages 511 through 514), May 1950.

"A Functional Description of the EDVAC," University of Pa. Moore School of E. E., vol. 1 (pages 4–10 to 4–13), vol. 2 (dwg. sht. 104–3Lc–3), November 1, 1949.

Electronic Engineering, "The Physical Realization of an Electronic Digital Computer," by A. D. Booth, pages 492 to 498; December 1950.

Rev. of Scientific Instruments, "A New Type of High Speed Coincidence Circuit," by Z. Bay, vol. 22, No. 6 (pages 397 through 400), June 1951.

The Design of Switching Circuits, by Keister, Richie and Washburn, published by Van Nostrand, June 1951 (pages 487 through 492).